(12) United States Patent
Kiper et al.

(10) Patent No.: US 9,786,010 B2
(45) Date of Patent: Oct. 10, 2017

(54) HOMEOWNERS INSURANCE APPLICATION PROCESS USING GEOTAGGED PHOTOS

(71) Applicant: STATE FARM MUTUAL AUTOMOBILE INSURANCE COMPANY, Bloomington, IL (US)

(72) Inventors: Timothy Kiper, Normal, IL (US); Dwayne Taylor, Bloomington, IL (US); Jeffrey Howard Abel, Bloomington, IL (US); Amy Engelhorn, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 476 days.

(21) Appl. No.: 14/259,676

(22) Filed: Apr. 23, 2014

(65) Prior Publication Data

US 2015/0310556 A1 Oct. 29, 2015

(51) Int. Cl.
*G06Q 40/08* (2012.01)
*G06Q 30/02* (2012.01)

(52) U.S. Cl.
CPC ......... *G06Q 40/08* (2013.01); *G06Q 30/0283* (2013.01)

(58) Field of Classification Search
CPC .................................................... G06Q 40/08
See application file for complete search history.

(56) References Cited

U.S. PATENT DOCUMENTS

| 8,194,986 | B2* | 6/2012 | Conwell | G06F 17/30265 |
| | | | | 382/224 |
| 8,886,206 | B2* | 11/2014 | Lord | G06F 17/30244 |
| | | | | 348/241 |
| 2006/0100912 | A1* | 5/2006 | Kumar et al. | 705/4 |
| 2010/0080551 | A1* | 4/2010 | Chen et al. | 396/310 |
| 2013/0013346 | A1* | 1/2013 | O'Connor et al. | 705/4 |
| 2013/0053005 | A1* | 2/2013 | Ramer et al. | 455/414.1 |
| 2013/0103459 | A1* | 4/2013 | Marshall et al. | 705/7.35 |
| 2013/0129142 | A1* | 5/2013 | Miranda-Steiner | 382/103 |
| 2014/0004883 | A1* | 1/2014 | Catalano et al. | 455/456.3 |
| 2014/0006129 | A1* | 1/2014 | Heath | 705/14.23 |

* cited by examiner

*Primary Examiner* — Bruce I Ebsersman
(74) *Attorney, Agent, or Firm* — Marshall, Gerstein & Borun LLP; Randall G. Rueth

(57) ABSTRACT

Methods, systems, and computer readable media are disclosed for determining a homeowners insurance quote from a captured image of a dwelling. The captured image includes geotagged information, and the address of the dwelling is determined by reverse geocoding this information. An insurance premium quote may then be generated based on the reverse geocoded address and any additional risk assessment factors, such as the building characteristics. Verification of the address may also be performed by accessing one or more databases, which may store information including addresses, coordinates, and images associated with the address. The building characteristics may be retrieved from one or more of the databases to allow for quote generation with minimal user intervention. Matching properties having comparative quotes near the dwelling address may also be generated.

25 Claims, 3 Drawing Sheets

HOMEOWNERS INSURANCE APPLICATION PROCESS USING GEOTAGGED PHOTOS

FIELD OF THE DISCLOSURE

The present disclosure relates to systems, method, and apparatus for generating insurance premium quotes and, more particularly, to using geotagged location data in an image of a dwelling to generate insurance premium quotes.

BACKGROUND

Homeowners insurance is practically a modern-day necessity. Often, people decide to voluntarily purchase homeowners insurance for their own peace of mind. Additionally, lenders and homeowners' associations typically require a homeowner to maintain a homeowners insurance policy. Since owning a homeowners insurance policy is such common practice, the homeowners insurance market has remained very competitive. As a result, homeowners often shop around for cheaper homeowners insurance premiums. Furthermore, homeowners may obtain several quotes for insurance premiums prior to purchasing a home in an attempt to find a better rate. Homeowners insurance quotes may be obtained online, but it is often difficult or impractical to verify the information entered by a client in such a manner.

Homeowners insurance premium quotes are based on several factors including the building characteristics and location of the dwelling. For example, a frame house may demand a higher quoted premium than a brick house, since frame houses are typically more prone to fire damage. Furthermore, the location of a dwelling plays an important role in determining risk assessment, since certain locations are more prone to loss than others. A person's unfamiliarity with building characteristic terminology may result in a cheaper (or more expensive) premium being quoted. Additionally, entering an incorrect address directional ("S" instead of "N") could severely impact the risk assessment factors and, in turn, the quoted premium. Therefore, ensuring the accuracy of online quoted homeowners insurance premiums presents several challenges.

DETAILED DESCRIPTION

Figure 1:
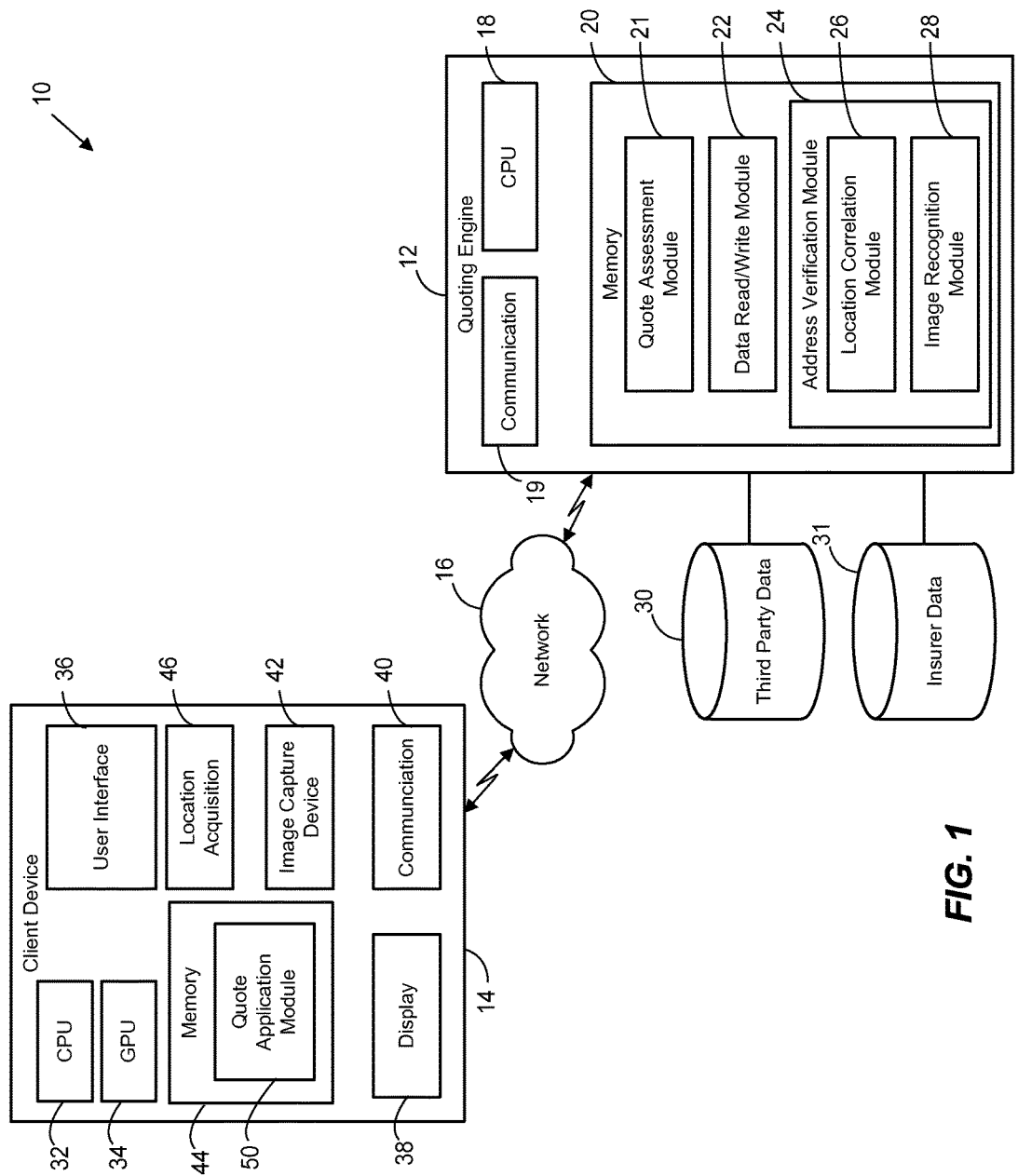
FIG. 1 is a block diagram of a quoting system 10 in accordance with an exemplary embodiment of the present disclosure.

FIG. 1 is a block diagram of a quoting system 10 in accordance with an exemplary embodiment of the present disclosure. Quoting system 10 includes a client device 14 configured to connect to a quoting engine 12 via a network 16. Network 16 may include any appropriate combination of wired and/or wireless communication networks. For example, network 16 may include any combination of a local area network (LAN), a metropolitan area network (MAN), a wide area network (WAN), and may facilitate a connection to the Internet. To provide further examples, network 16 may include wired telephone and cable hardware, satellite, cellular phone communication networks, etc.

Client device 14 includes an image capture unit 42, a user interface 36, a central processing unit (CPU) 32, a graphics processing unit (GPU) 34, a memory 44, a display 38, a location acquisition unit 46, and a communication unit 40. In an embodiment, client device 14 is implemented as a user equipment (UE), such as a mobile device, a computer, laptop, tablet, desktop, or any other suitable type of computing device.

Location acquisition unit 46 is configured to obtain location data corresponding to a location of a device in which location acquisition unit 46 is implemented, such as client device 14, for example. As will be appreciated by those of skill in the relevant art(s), location acquisition unit 46 may be implemented using any combination of suitable hardware and/or software to determine this location data. For example, location acquisition unit 46 may be implemented as a global navigation satellite system (GNSS) receiver configured to determine latitude and longitude coordinates via GNSS satellite communications using any suitable GNSS frequency or one or more bands of GNSS frequencies.

Alternatively or additionally, various embodiments of location acquisition unit 46 are configured to obtain location information via one or more triangulation and/or network localization techniques. For example, location acquisition unit 46 may be configured to utilize wireless communications via communication unit 40 to determine a location of client device 14 by calculating the location based on signal strength measurements of one or more base stations, access points, etc. within range of communication unit 40. These base stations and access points could include, for example, cellular base stations, local WAN access points, etc.

In an embodiment, location acquisition unit 46 is configured to determine the location data and to send this location data to image capture unit 42. In an embodiment, location acquisition unit 46 is configured to translate this location data to metadata prior to sending it to image capture unit 42. The location data could include, for example, latitude and longitude coordinates, altitude, accuracy data, etc.

Image capture unit 42 is configured to capture an image in a digital format. Image capture unit 42 may be implemented as a camera coupled to client device 14. Although image capture unit 42 is illustrated in FIG. 1 as being integrated within client device 14, various embodiments include image capture unit 42 being internal or external to client device 14. For example, image capture unit 42 may be implemented as a webcam coupled to client device 14 and configured to communicate with client device 14 to transfer digital images. Furthermore, image capture unit 42 may be implemented as a digital camera configured to transfer digital images to client device 14 and/or to quoting engine 12. Such transfers may occur via any suitable wired and/or wireless communications, network 16, and/or a transfer from a physical memory card device (e.g., SD Card, Flash card, etc.), for example.

In an embodiment, image capture unit 42 is configured to use location data received from location acquisition unit 46 to add geographical identification metadata to a captured image, thereby generating a geotagged image. In an embodiment, image capture unit 42 receives the location data as metadata from location acquisition unit 46 and adds it to the captured image to generate a geotagged image. In another embodiment, image capture unit 42 translates the location data to metadata to generate a geotagged image.

Communication unit 40 is configured to enable data communications between client device 14 and quoting engine 12 via network 16. In an embodiment, communication unit 40 is configured to send data and/or one or more geotagged images captured by image capture unit 42 to quoting engine 12. For example, communication unit 40 may send a geotagged image of a dwelling to quoting engine 12 via network 16. Further in accordance with this embodiment, communication unit 40 is configured to receive data, such as insurance premium quotes, building characteristics, etc., from quoting engine 12.

As will be appreciated by those of skill in the relevant art(s), communication unit 40 may be implemented with any combination of suitable hardware and/or software to enable these functions. For example, communication unit 40 may be implemented with any number of wired and/or wireless transceivers, network interfaces, physical layers (PHY), etc. In embodiments in which client device 14 is a mobile device, communication unit 40 optionally enables communications with one or more networks, which may or may not be part of network 16. For example, communication unit 40 could be configured to communicate with cellular and/or WLAN networks in addition to network 16. Networks separate from network 16 are not shown in FIG. 1 for purposes of brevity.

In various embodiments, communication unit 40 is configured to measure the strength of signals received from other communication devices within range and to provide these measurements to location acquisition unit 46. For example, in embodiments in which client device 14 is implemented as a mobile device, communication unit 40 may be configured to measure the signal strength of signals received from one or more base stations. Alternatively or additionally, communication unit 40 may be configured to measure signal strengths of signals received from one or more access points. In this way, communication unit 40 may provide location acquisition unit 46 an additional or alternate way of determining location data. Such embodiments might be particularly useful when, for example, a GNSS satellite signal is unavailable.

User interface 36 is configured to allow a user to interact with client device 14. For example, user interface 36 may include a user-input device such as an interactive portion of display 38 (e.g., a "soft" keyboard displayed on display 38), an external hardware keyboard configured to communicate with client device 14 via a wired or a wireless connection (e.g., a Bluetooth keyboard), an external mouse, or any other suitable user-input device.

CPU 32 and/or GPU 34 are configured to communicate with memory 44 to store to and read data from memory 44. In accordance with various embodiments, memory 44 is a computer-readable non-transitory storage device that may include any combination of volatile (e.g., a random access memory (RAM), or a non-volatile memory (e.g., battery-backed RAM, FLASH, etc.). Memory 44 is configured to store instructions executable on CPU 32 and/or GPU 34. These instructions may include machine readable instructions that, when executed by CPU 32 and/or GPU 34, cause CPU 32 and/or GPU 34 to perform various acts.

Quote application module 50 is a portion of memory 44 configured to store instructions, that when executed by CPU 32 and/or GPU 34, cause CPU 32 and/or GPU 34 to enable user interface 36 to collect user input and to display feedback to a user in accordance with one or more applications and/or programs. For example, executable instructions stored in quote application module 50 may enable user interface 36 to display one or more prompts to a user and/or to accept user input, which could include entering data into one or more data fields, for example. In an embodiment, instructions stored in quoting module 50 enable a user to enter suitable data to obtain one or more insurance premium quotes.

In various embodiments, quote application module 50 enables user interface 36 to facilitate sending this data to another device, such as quoting engine 12, for example, via communication unit 40. For example, quote application module 50 could include instructions that enable user interface 36 to collect relevant data from a user and then allow the user to submit the relevant data to another quoting engine 12 by clicking or pressing an appropriate interactive button. Examples of relevant data for homeowners insurance quotes could include personal information, contact information, a street address, one or more building characteristics, and/or a captured geotagged image, etc. Further in accordance with various embodiments, quote application module 50 includes instructions to enable user interface 36 to fill one or more appropriate fields within a quoting application based on data received from another device via communication unit 40, such as quoting engine 12, for example. Quote application module 50 optionally provides instructions to enable user interface 36 to prompt a user to verify any relevant data entered based on feedback received from another communication device, such as quoting engine 12, for example.

Although FIG. 1 illustrates client device 14 communicating with only quoting engine 12, various embodiments include client device 14 communicating with any suitable number of other communication devices. Quoting engine 12 includes CPU 18, communication unit 19, and memory 20.

Quoting engine 12 may be implemented as any suitable computing device. In various embodiments, quoting engine 12 is implemented within a server, a laptop computer, a tablet computer, a smartphone, etc. In various embodiments, quoting engine 12 is implemented as an integral part of client device 14, separate from client device 14, or external to client device 14. In accordance with embodiments in which quoting engine 12 is implemented as an integral part of client device 14, CPU 32 may communicate with quoting engine 12, third-party database 30, and/or insurer database 31 directly via a communication unit, and thus network 16 may be omitted. Further in accordance with such an embodiment, CPU 32 and/or memory 44 may have a structure similar to, and provide the same functionality as, CPU 18 and/or memory 20, respectively. Still further in accordance with such an embodiment, one of CPU 18 or CPU 32 may be omitted, and likewise one of memory 20 or memory 44 may be omitted. When one of these CPUs or memories are omitted, the functionality of both CPU 32 and CPU 18 is integrated into a single CPU, and likewise memory 44 and memory 20 may be integrated as part of a single memory device.

Communication unit 19 has a structure substantially similar to communication unit 40 and provides substantially the same functionality as communication unit 40; therefore, only differences between communication unit 40 and communication unit 19 will be further described. In various embodiments, communication unit 19 is configured to enable data communications between client device 14 and quoting engine 12 via network 16. This data could include any suitable relevant quoting data, for example, sent from client device 14 to obtain one or more homeowners insurance premium quotes. To provide another example, this data could also include data retrieved from third party database 30 and/or insurer database 31 and/or calculated insurance premium quotes sent from quoting engine 12 to client device 14. Further in accordance with these embodiments, communication unit 19 is configured to communicate with third-party database 30 and/or insurer database 31 to enable CPU 18 to store to and read data from third-party database 30 and/or insurer database 31.

CPU 18 is configured to communicate with memory 20 to store to and read data from memory 20. In accordance with various embodiments, memory 20 is a computer-readable non-transitory storage device that may include any combination of volatile (e.g., a random access memory (RAM), or non-volatile memory (e.g., battery-backed RAM, FLASH, etc.). Memory 20 is configured to store instructions executable by CPU 18. These instructions may include machine readable instructions that, when executed by CPU 18, cause CPU 18 to perform various acts.

Data read/write module 22, quote assessment module 21, and address verification module 24 are portions of memory 20 configured to store instructions executable by CPU 18. Location correlation module 26 and image recognition module 28 are portions of memory 20 on which address verification module 24 operates.

Quote assessment module 21 includes instructions that, when executed by CPU 18, causes CPU 18 to perform one or more premium quote calculations based on any suitable relevant data. These calculations could be based on, for example, a risk assessment algorithm that utilizes relevant quoting data such as a dwelling address and/or building characteristics of a dwelling to generate an insurance premium quote. As will be appreciated by those of skill in the relevant art(s), a quote calculating algorithm may be tailored based on a particular set of data and/or assessed risk. For example, if a user's personal data indicates that a client is a new customer or a loyal one, then the algorithm may calculate the insurance premium quote by taking these factors into consideration.

Data read/write module 22 includes instructions that, when executed by CPU 18, causes CPU 18 to read data from and/or to write data to third party database 30 and/or insurer database 31 via communication unit 19. In an embodiment, data read/write module 22 enables CPU 18 to access third party database 30 and/or insurer database 31 to verify relevant data received from client device 14. In accordance with another embodiment, data read/write module 22 enables CPU 18 to update and/or overwrite data in third party database 30 and/or insurer database 31. For example, updating may be performed when inconsistent data is found between third party database 30 and insurer database 31. To provide another example, updating may be performed when data entered by a user and received from client device 14 is inconsistent with data found in third party database 30 and/or insurer database 31. In an embodiment, data read/write module 22 enables CPU 18 to query data from third party database 30 and/or insurer database 31 and/or store this data in memory 20. Further in accordance with this embodiment, data read/write module 22 includes instructions that enable CPU 18 to access stored data from memory 20 when executing instructions from quote assessment module 21, location correlation module 26, and/or image recognition module 28.

Address verification module 24 optionally includes a location correlation module 26 that, when executed by CPU 18, causes CPU 18 to reverse geocode the geotagged location data within an image. In an embodiment, reverse geocoding includes correlating the geotagged location data to location data stored in third party database 30 and/or insurer database 31. For example, third party database 30 and/or insurer database 31 could include a range of latitude and longitude coordinates mapped to boundaries of a street address. Using this example, reverse geocoding could include determining whether the geotagged location data falls within this range of latitude and longitude coordinates. If it does, then the instructions stored in address verification module 24 could enable CPU 18 to verify that the reverse geocoded address is the address of the dwelling for which an insurance premium quote is sought.

Third party database 30 may store any suitable data relevant for calculation of a homeowners insurance premium quote. Examples of data stored in third party database 30 may include, for example, images of one or more dwellings, one or more addresses of one or more dwellings, a range of latitude and longitude coordinates associated with one or more dwelling addresses, building characteristics, and/or public record data. To provide further examples, third party database 30 may include claim data, multiple listing service (MLS) data, property tax records, etc. In various embodiments, third party database 30 is implemented within client device 14 or quoting engine 12, separate from client device 14 or query engine 12, or external to client device 14 or query engine 12.

Insurer database 31 may likewise store any suitable data relevant for calculation of a homeowners insurance premium quote. Examples of data stored in insurer database 30 may include, for example, images of one or more dwellings, one or more addresses of one or more dwellings, a range of latitude and longitude coordinates associated with one or more dwelling addresses, building characteristics, previous homeowners insurance information on file, current and/or previous homeowners premium quotes, etc. In various embodiments, insurer database 31 includes any combination of publicly available data and/or private data held by an insurer that is not publicly available. For example, an insurer database dwelling entry could include a dwelling address, a range of latitude and longitude coordinates associated with the property boundaries of the dwelling address, and one or more images of the dwelling address. In various embodiments, insurer database 31 is implemented within client device 14 or quoting engine 12, separate from client device 14 or query engine 12, or external to client device 14 or query engine 12.

Address verification module 24 optionally includes an image recognition module 28. Image recognition module 28 includes instructions that, when executed by CPU 18, causes CPU 18 to correlate the geotagged image received from client device 14 with one more images stored in third party database 30 and/or insurer database 31. Image recognition 28 may include any image recognition algorithm to enable CPU 18 to perform image correlation. For example, image recognition module 28 could include instructions for an edge matching algorithm, a histogram matching algorithm, a grayscale matching algorithm, etc.

In various embodiments, address verification module 24 includes only location correlation module 26, only image recognition module 28, or both location correlation module 26 and image recognition module 28. Embodiments of address verification module 24 including both location correlation module 26 and image recognition module 28 may be implemented, for example, when additional verification is desired to ensure that a received geotagged image is correlated to both an address and an image in third party database 30 and/or insurer database 31.

In accordance with various embodiments, any of quote assessment module 21, data read/write module 22, address verification module 24, location correlation module 26, and/or image recognition module 28 operates as a separately executable software application, a plugin that extends the functionality of another software application such as a web browser, an application programming interface (API) invokable by a software application, etc. The instructions included within any of quote assessment module 21, data read/write module 22, address verification module 24, location correlation module 26, and/or image recognition module 28 may be compiled and executable on the CPU 18 directly, or not compiled and interpreted by the CPU 18 on a runtime basis.

FIG. 1 illustrates quoting engine 12 coupled directly to third party database 30 and insurer database 31 for purposes of brevity. As will be appreciated by those of skill in the relevant art(s), various embodiments of quoting engine 12 include accessing third party database 30 and/or insurer database 31 via any suitable network, which may be substantially similar to network 16, for example. In accordance with such embodiments, quoting engine 12 is configured to access third party database 30 and insurer database 31 via a network such that third party database 30, insurer database 31, and/or quoting engine 12 need not be co-located. For example, in accordance with such embodiments, quoting engine 12 may access third party database 30 via a connection to the Internet to download relevant premium quoting information. To provide another example, quoting engine 12 may access insurer database 31 via a local, secure connection to one or more private servers to download relevant premium quoting information.

Although illustrated as a single engine in FIG. 1, in various embodiments, quoting engine 12 may consist of any number or group of one or more quoting engines. In accordance with such embodiments, each quoting engine may include one or more CPUs and be configured to operate independently of the other quoting engines. Quoting engines operating as a group may process requests from client device 14 individually (e.g., based on their availability) and/or concurrently (e.g., parallel processing). Quoting engines operating as a group may process requests from the client device 14 in a prioritized and/or distributed manner. For example, an operation associated with processing a request may be performed on one quoting engine while another operation associated with processing the same request (or a different request) is performed on another quoting engine.

Figure 2:
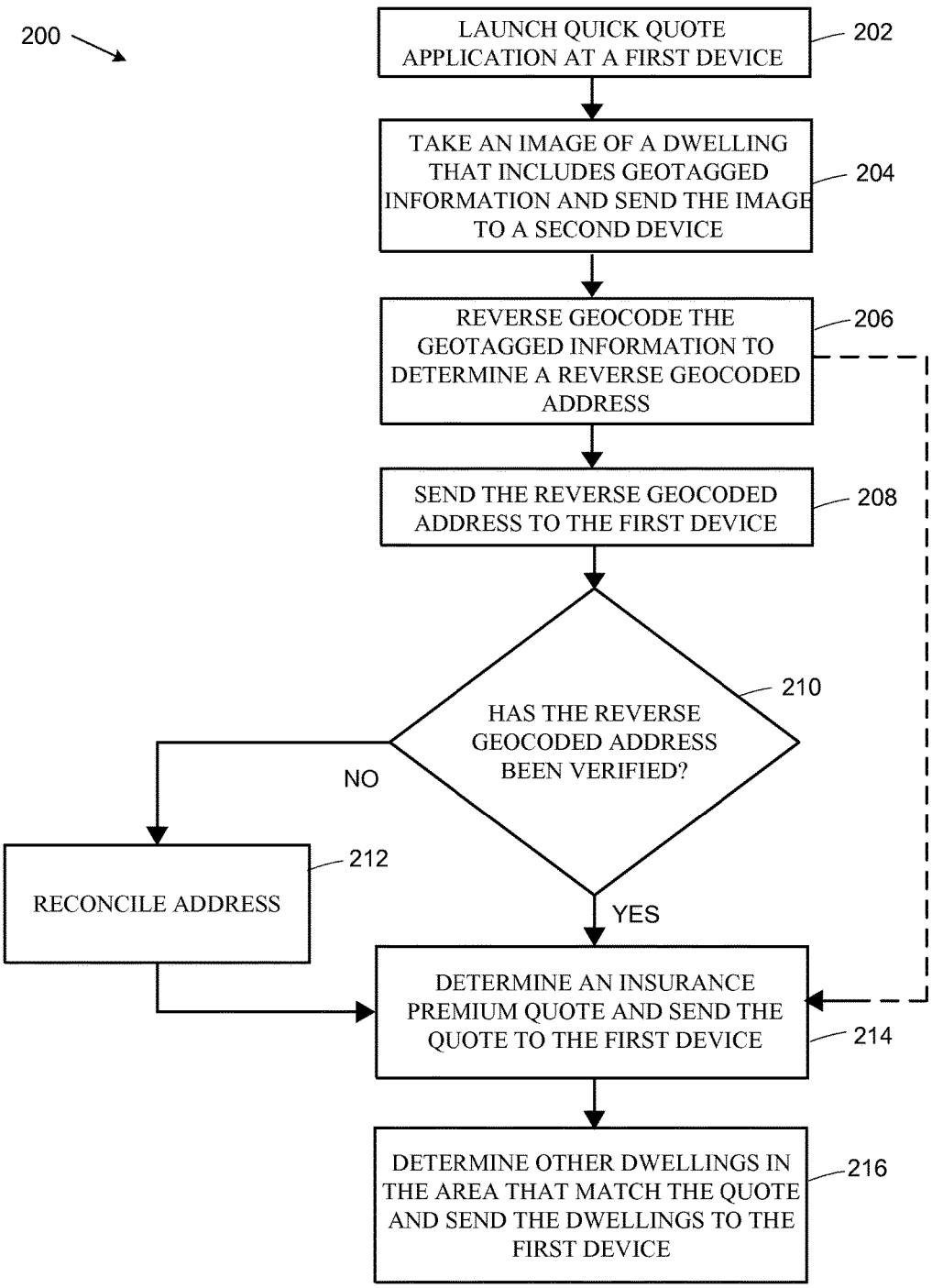
FIG. 2 illustrates a quote method 200 in accordance with an exemplary embodiment of the present disclosure.

FIG. 2 illustrates a quote method 200 in accordance with an exemplary embodiment of the present disclosure. In various embodiment, quote method 200 is implemented as a part of quote system 10, as shown in FIG. 1.

Method 200 begins at block 202, at which a quick quote application is started on a first device. This first device could include, for example, client device 14, as shown in FIG. 1. Further in accordance with this embodiment, this application could include, for example, an application run by CPU 32 executing instructions stored in quote application module 50.

At block 204, an image is taken of a dwelling including geotagged information and sent to a second device. This image could be taken, for example, by a user of the first device. The image could include, for example, a dwelling for which a user wishes to obtain a homeowners insurance quote. The second device could include, for example, quoting engine 12, as shown in FIG. 1.

At block 206, the geotagged information in the geotagged image is reverse geocoded to determine a reverse geocoded address. For example, this determination could be made at quoting engine 12 or at client device 14 by accessing third party database 30 and/or insurer database 31.

At block 208, the reverse geocoded address is sent back to the first device. This could include, for example, sending the reverse geocoded address from quoting engine 12 back to client device 14 via network 16.

At block 210, a determination is made whether the reverse geocoded address has been verified as being correct. In an embodiment, this verification includes a user determining whether the reverse geocoded address matches the address of the dwelling that was captured in the geotagged image. This determination could be made, for example, by displaying the reverse geocoded address to the user and prompting the user to verify the reverse geocoded address is correct. If the user determines that the reverse geocoded address is correct, then method 200 continues to block 214. If the user determines that the reverse geocoded address is incorrect, then method 200 continues to block 212.

In another embodiment, the reverse geocoded address is verified without user intervention. For example, the reverse geocoded addresses obtained from third party database 30 could be compared to the reverse geocoded address obtained from insurer database 31. For example, a reverse geocoded address 'A' obtained from third party database 30 might not match a reverse geocoded address 'B' obtained from insurer database 31. In accordance with such an embodiment, method 200 continues to block 212 when mismatched and/or inconsistent reverse geocoded addresses are identified. If the reverse geocoded addresses match, then method 200 continues to block 214.

At block 212, an incorrect, mismatched, and/or inconsistent reverse geocoded address is reconciled. In an embodiment, reconciling the reverse geocoded address is performed in response to an updated dwelling address verified by a user in block 210. In accordance with such an embodiment, reconciling the reverse geocoded address could include, for example, quoting engine 12 updating third party database 30 and/or insurer database 31 with the updated dwelling address sent from client device 14 to quoting engine 12.

In another embodiment, reconciling the reverse geocoded address is performed by identifying mismatches between reverse geocoded addresses obtained from third party database 30 and insurer database 31. In accordance with such an embodiment, a priority hierarchy may be utilized to resolve inconsistencies. For example, an insurer may decide that one database contains more reliable data than the other database. Therefore, in an embodiment, instructions stored in location correlation module 26 and/or quote assessment module 21 resolve such inconsistencies based on a preferred database.

Further in accordance with this embodiment, reconciling reverse geocoded address could include quoting engine 12 updating third party database 30 or insurer database 31 based on which database is more accurate, such that both databases contain the same address data for future use. As will be appreciated by those of skill in the relevant art(s), the decision of which database is deemed more accurate may be decided based on user knowledge, preferences, an inability to update one or more portions of third party database 30 and/or insurer database 31, etc.

In an embodiment, no address verification is performed. In accordance with such an embodiment, a reverse geocoded address obtained from either third party database 30 or insurer database 31 is assumed to be correct, and thus blocks 208, 210, and 212 are omitted. This embodiment is illustrated by the dashed line in FIG. 2 indicating a flow of method 200 from block 206 to block 214.

At block 214, an insurance premium quote is determined based on the verified dwelling address, and this premium quote is sent back to the first device. This determination could be made, for example, by one or more algorithms performed by CPU 18 executing instructions stored in quote assessment module 21. If the reverse geocoded address was reconciled at block 212, then the premium quote determined at block 214 is based on the updated/reconciled address in block 212.

At block 216, a determination is made whether other dwellings in the vicinity match the insurance premium quote calculated in block 214, and these results are sent back to the first device. This determination could be made, for example, by one or more algorithms performed by CPU 18 executing instructions stored in quote assessment module 21. These instructions could include, for example, an algorithm that uses a target percentage of the premium quote determined in block 214 and/or a radius from the verified dwelling address used for the calculation in block 214. For example, using a premium quote of $100 per month for dwelling address 'A' as an example, quoting engine 12 may access third party database 30 and/or insurer database 31 to look up other dwellings within a mile radius of address A that have premium quotes within ±10% of the calculated quoted premium (i.e., $90-$110 per month).

In an embodiment, the target percentage and/or dwelling radius values are predetermined. In another embodiment, the target percentage and/or dwelling radius values are chosen by a user of client device 14. Embodiments including block 216 may be particularly useful when, for example, a potential homeowner is looking for insurance quotes for a property that has not yet been purchased and other dwelling premiums in the area may be of interest to the user. In some embodiments, a user may have already obtained several quotes using any suitable methods as discussed throughout this disclosure. In accordance with such embodiments, block 216 could include quoting engine 12 accessing third party database 30 and/or insurer database 31 to retrieve quotes that match the target percentage and/or dwelling radius values based on a user's prior quoting history.

In addition, in various embodiments, block 216 could include a user obtaining several quotes using any suitable methods as discussed throughout this disclosure, which are then stored in a database, such as insurer database 31, for example. Further in accordance with such embodiments, block 216 could include quoting engine 12 accessing insurer database 31 to obtain those quotes for each of the properties that match the target percentage and/or dwelling radius values. In other words, such embodiments allow the various quoting systems as described herein to be applied to several dwellings within a dwelling radius, with only a subset of those dwellings that match the target percentage within the dwelling radius being shown to the user.

In other embodiments, block 216 could include quoting engine 12 accessing third party database 30 and/or insurer database 31 to retrieve quotes that match the target percentage and/or dwelling radius values based on any suitable quoting system. Such quotes could include, for example, premiums that may or may not have been previously quoted in accordance with methods as discussed throughout this disclosure. In accordance with an embodiment, block 216 is omitted.

Figure 3:
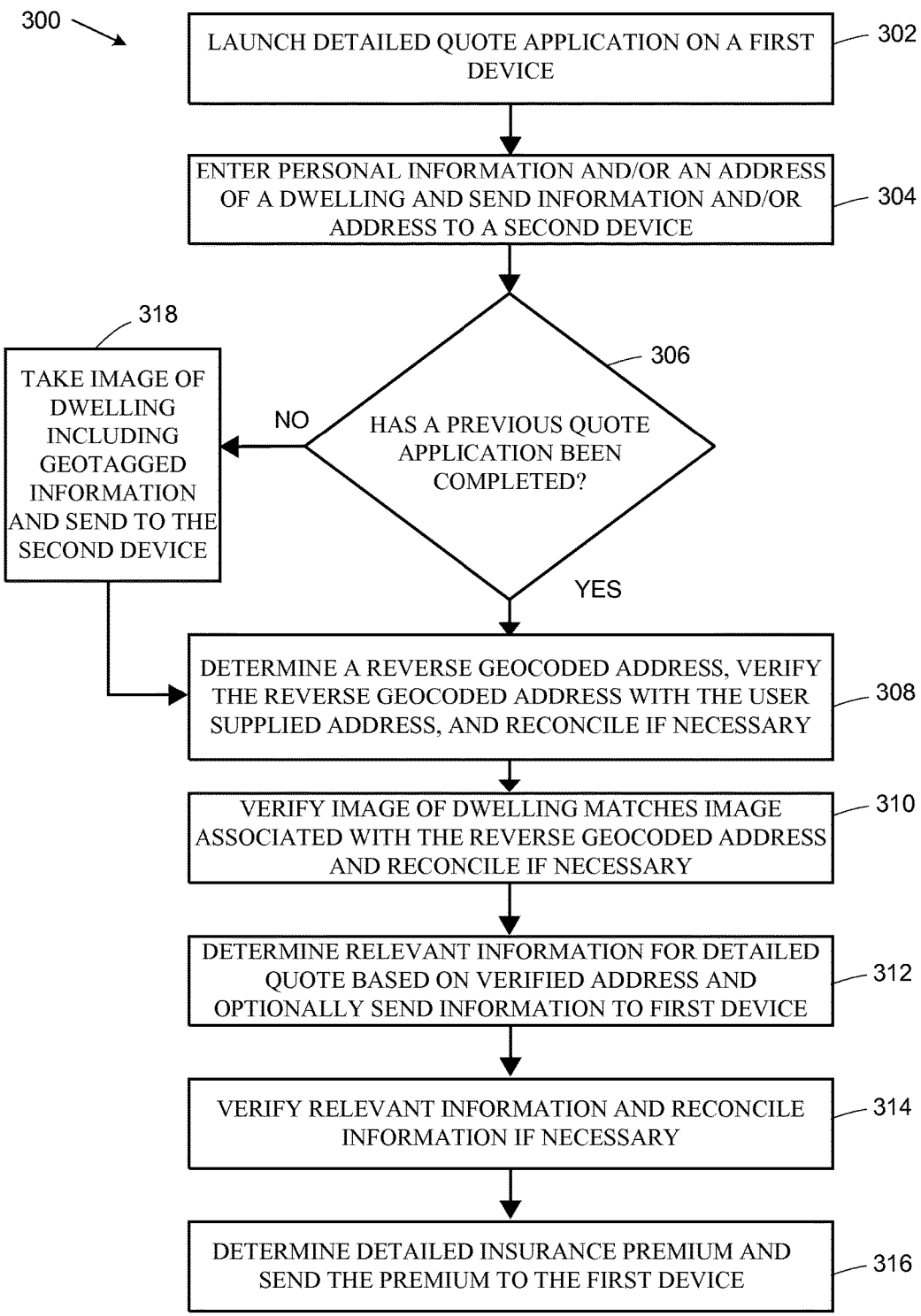
FIG. 3 illustrates a quote method 300 in accordance with an exemplary embodiment of the present disclosure.

FIG. 3 illustrates a quote method 300 in accordance with an exemplary embodiment of the present disclosure. In various embodiments, detailed quote method 300 is implemented as a part of quote system 10, as shown in FIG. 1. In an embodiment, quote method 300 provides a more precise insurance premium quote compared to quote method 200.

Method 300 begins at block 302, at which a detailed quote application is started on a first device. This first device could include, for example, client device 14, as shown in FIG. 1. Further in accordance with this embodiment, this application could include, for example, an application run by CPU 32 executing instructions stored in quote application module 50.

At block 304, a user enters personal information and/or an address of the dwelling for which a detailed homeowners insurance premium quote is sought. Personal information could include, for example, contact information such as the users' name, e-mail address, etc. In accordance with an embodiment, the dwelling address is entered by the user. In accordance with other embodiments, the dwelling address is not entered by the user.

At block 306, a determination is made whether a previous quote application been completed, such as quote method 200, for example. For example, a user may initially run quote method 200 from client device 14 to determine an insurance premium quote based on only a geotagged captured image. Using this example, a user may later launch quote method 300 to obtain a more accurate quote based on additional information. In accordance with an embodiment, client 14 stores the previously captured geotagged image and/or quoted premium in memory 44. In such a case, the geotagged image does not need to be retaken, and therefore method 300 continues to block 308. However, if quote method 200 has not been completed and/or a geotagged image of the dwelling does not yet exist, then method 300 continues to block 318.

At block 318, an image is taken of a dwelling including geotagged information. This image could be taken, for example, by a user of the client device. The image could include, for example, a dwelling for which a user wishes to obtain a homeowners insurance premium quote.

At block 308, a reverse geocoded address is determined using the geotagged data within the image that was either already captured during quote method 200 or at block 318. In an embodiment in which no address has been entered at block 304, block 308 operates in substantially the same manner as blocks 206, 208, 210, and 212, as shown in FIG. 2. But in accordance with an embodiment in which a user has entered a dwelling address, block 308 additionally includes verifying the reverse geocoded address using the dwelling address. This verification could be performed, for example, by CPU 18 executing instructions stored in location correlation module 26. This verification could include, for example, CPU 18 verifying whether a reverse geocoded address obtained from third party database 30 and/or insurer database 31 matches the dwelling address entered by the user. If the dwelling address matches the reverse geocoded address obtained from third party database 30 and/or insurer database 31, then method 300 continues to block 310.

However, if the reverse geocoded address obtained from third party database 30 and/or insurer database 31 does not match the dwelling address entered by the user, then block 308 additionally includes reconciling this inconsistency. For example, similar to block 210 as shown in FIG. 2, reconciling could include generating a prompt for the user to verify and potentially correct the entered address. To provide another example, reconciling could include updating third party database 30 and/or insurer database 31 with the dwelling address entered by the user. As previously discussed with regards to block 212 in FIG. 2, various embodiments of block 308 include reconciling via hierarchical prioritization of a preferred source of a dwelling address. In accordance with such embodiments, either the reverse geocoded address or the dwelling address entered by a user is selected based on any number of preferences.

For example, in an embodiment, reconciling including updating an address stored in third party database 30 and/or insurer database 31 with a dwelling address entered by a user. In another embodiment, the reverse geocoded address determined from either third party database 30 or insurer database 31 overrides the dwelling address entered by a user.

In accordance with various embodiments, reconciling optionally includes flagging these inconsistencies between a dwelling address entered by a user and addresses found in either third party database 30 or insurer database 31. Further in accordance with such embodiments, reconciling includes generating a notification (e.g., an e-mail) to one or more insurance agents to follow up and rectify any inconsistencies.

At block 310, the image of the dwelling is verified using an image of the dwelling corresponding to the reverse geocoded address. This image could include, for example, an image stored in third party database 30 and/or insurer database 31. In an embodiment, block 310 includes reconciling for inconsistencies between these images by updating the third party database 30 and/or insurer database 31 or by adding the captured dwelling image if no image is present in either database. In another embodiment, verifying the captured image includes determining that the dwelling image and the image stored in third party database 30 and/or insurer database 31 match one another. This could include, for example, using any suitable image recognition algorithm executed by CPU 18 reading instructions from image recognition module 28.

Similar to the address reconciliation embodiments described with respect to block 308, various embodiments of reconciling the dwelling image include prioritizing and reconciling images found in third party database 30 and/or insurer database 31 with the captured image. For example, reconciling the image could include sending the image back to a user to verify the image. To provide another example, reconciling the image could include reconciling mismatches between different images found in third party database 30 and/or insurer database 31 by updating one (or both) of these databases so they contain the same image.

At block 312, method 300 includes determining relevant information for the calculation of a detailed insurance premium quote. This relevant information could include, for example, building characteristics, a surrounding area of the dwelling, dwelling construction materials, the age of the dwelling, etc. In accordance with various embodiments, data entries corresponding to the reverse geocoded address in third party database 30 and/or insurer database 31 include this relevant information. In accordance with such embodiments, this information is obtained from third party database 30 and/or insurer database 31. This information could be obtained, for example, by CPU 18 executing instructions stored in data read/write module 22. In an embodiment, quoting engine 12 retrieves the relevant information and optionally sends it back to client device 14, where this relevant information is entered into appropriate fields of the detailed quoting application within user interface 36. Further in accordance with this embodiment, a user does not need to manually enter this information.

At block 314, method 300 includes verifying the relevant information obtained in block 312. In an embodiment in which quoting engine 12 sends this information back to client device 14, block 314 could include, for example, prompting a user to consider this information and to verify that it is correct. Reconciliation in block 314 could include, for example, reconciling inconsistencies between information indicated as incorrect by the user, information obtained via third party database 30, and/or information obtained via insurer database 31.

That is, if a user determines that there is an inconsistency and/or third party database 30 and/or insurer database 31 contain inconsistent information, reconciling in block 314 could include reconciling this information in accordance with an established priority, as previously discussed with respect to blocks 308 and 310. Therefore, various embodiments of block 314 include user verification of the relevant information, comparison of the relevant information from third party database 30 and/or insurer database 31, and reconciliation/updating of the relevant information between the user, third party database 30, and/or insurer database 31.

At block 316, a detailed insurance premium is determined based on the verified dwelling address and the verified relevant quoting information. This determination could be made, for example, by one or more algorithms performed by CPU 18 utilizing instructions stored in quote assessment module 21. This algorithm could be based on, for example, one or more risk assessment calculations associated with the dwelling address and/or the relevant quoting information. If the dwelling address, dwelling image, and/or relevant information was reconciled at blocks 308, 310, and 314, respectively, then this determination is based on the updated/reconciled dwelling address, dwelling image, and/or relevant information.

In an embodiment of method 300, no user intervention is required after blocks 304 and/or 318. For example, once a user enters personal information, captures an image of the dwelling with geocoded information, and/or enters an address of the dwelling, the insurance premium quote could be displayed to the user via user interface 36. In accordance with such an embodiment, the personal information, captured geocoded image, and/or address of the dwelling are sent to quoting engine 12 once the user decides to submit this information. In accordance with such an embodiment, the insurance premium quote is displayed for the user after this information is submitted, and a user is not prompted to reconcile or verify any information.

Further in accordance with such an embodiment, the user may optionally be notified of any conflicts that require reconciliation with the returned quoted premium. The user may then be prompted to verify and/or reconcile any data used in calculating the quoted premium and to re-submit this data for another quote. In this way, method 300 allows a user to obtain an initial detailed and accurate quote quickly that may not require any data reconciliation while providing feedback to the user once the quote is generated in case reconciliation is needed.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for determining an insurance premium quote, comprising:
    capturing, by an image capture unit, a first image of a dwelling;
    determining, by a location acquisition unit, geographic location data corresponding to a location of the image capture unit;
    adding, by the image capture unit, the geographic location data as metadata to the first image of the dwelling such that the first image of the dwelling includes geotagged information;
    reverse geocoding, by one or more processors, the geotagged information to determine a reverse geocoded address;
    correlating, by one or more processors, the first image of the dwelling to a second image of the dwelling that is stored in a database via execution of an image matching recognition algorithm to match the first image of the dwelling to the second image of the dwelling, the second image of the dwelling being stored in the database and having a database dwelling address and one or more building characteristics associated therewith;
    determining, by one or more processors, whether the reverse geocoded address associated with the first image of the dwelling matches the database dwelling address associated with the second image of the dwelling;
    verifying, by one or more processors, the reverse geocoded address as the correct dwelling address when the reverse geocoded address matches the database dwelling address,
    when there is an inconsistency because the reverse geocoded address does not match the database dwelling address, reconciling, by one or more processors, the inconsistency utilizing a pre-established set of hierarchical prioritization that is based upon data source reliability to establish one of (i) the reverse geocoded address, or (ii) the database dwelling address, as the correct dwelling address;
    accessing, by one or more processors, the database storing the second image of the dwelling to identify the one or more building characteristics associated with the correct dwelling address;
    calculating, by one or more processors, an insurance premium quote using the correct dwelling address and the one or more building characteristics; and
    displaying, by one or more processors, the insurance premium quote.

2. The method of claim 1, further comprising:
    identifying, by one or more processors, a plurality of other dwellings within a predetermined distance of the correct dwelling address that have insurance premium quotes matching the insurance premium quote within a threshold amount.

3. The method of claim 1, wherein the act of reconciling the inconsistency comprises:
    prompting, by one or more processors, a user to verify that the reverse geocoded address matches the database dwelling address; and
    establishing the correct dwelling address based upon the user's response to the prompt.

4. The method of claim 3, further comprising:
    calculating, by one or more processors, the insurance premium quote using the reverse geocoded address as the correct dwelling address once the user verifies that the reverse geocoded address matches the database dwelling address.

5. The method of claim 3, further comprising:
    when the database dwelling address is not the correct address, updating, by one or more processors, the database dwelling address with the correct dwelling address based upon the user's response to the prompt.

6. The method of claim 1, further comprising:
    when the database dwelling address is not the correct address, updating, by one or more processors, the database dwelling address with the reverse geocoded address.

7. The method of claim 1, further comprising:
    transmitting, by one or more processors, the one or more building characteristics to a computing device; and
    populating, by the computing device, one or more building characteristic fields within a computer-implemented application executed on the computing device with the one or more respective building characteristics.

8. The computer-implemented method of claim 1, wherein the image matching recognition algorithm includes one or more of an edge matching algorithm, a histogram matching algorithm, and a grayscale matching algorithm.

9. A non-transitory, tangible computer-readable medium storing machine readable instructions that, when executed by a processor, cause the processor to:
capture a first image of a dwelling via an image capture unit;
determine geographic location data corresponding to a location of the image capture unit;
add the geographic location data as metadata to the first image of the dwelling such that the first image includes geotagged information;
reverse geocode the geotagged information to determine a reverse geocoded address;
correlate the first image of the dwelling to a second image of the dwelling that is stored in a database via execution of an image matching recognition algorithm to match the first image of the dwelling to the second image of the dwelling, the second image of the dwelling being stored in the database and having a database dwelling address and one or more building characteristics associated therewith;
determine whether the reverse geocoded address associated with the first image of the dwelling matches the database dwelling address associated with the second image of the dwelling;
verify the reverse geocoded address as the correct dwelling address when the reverse geocoded address matches the database dwelling address;
when there is an inconsistency because the reverse geocoded address does not match the database dwelling address, reconciling the inconsistency utilizing a pre-established set of hierarchical prioritization that is based upon data source reliability to establish one of (i) the reverse geocoded address, or (ii) the database dwelling address, as the correct dwelling address;
accessing the database storing the second image of the dwelling to identify the one or more building characteristics associated with the correct dwelling address;
calculate an insurance premium quote using the correct dwelling address and the one or more building characteristics; and
display the insurance premium quote.

10. The non-transitory, tangible computer-readable medium of claim 9, further storing instructions that, when executed by the processor, cause the processor to:
identify a plurality of other dwellings within a predetermined distance of the correct dwelling address that have insurance premium quotes matching the insurance premium quote within a threshold amount.

11. The non-transitory, tangible computer-readable medium of claim 9, wherein the instructions to reconcile the inconsistency further include instructions that, when executed by the processor, cause the processor to:
prompt a user to verify that the reverse geocoded address matches the database dwelling address; and
establish the correct dwelling address based upon the user's response to the prompt.

12. The non-transitory, tangible computer-readable medium of claim 11, further storing instructions that, when executed by the processor, cause the processor to:
calculate the insurance premium quote using the reverse geocoded address as the correct dwelling address once the user verifies that the reverse geocoded address matches the database dwelling address.

13. The non-transitory, tangible computer-readable medium of claim 11, further storing instructions that, when executed by the processor, cause the processor to:
when the database dwelling address is not the correct address, update the database dwelling address with the correct dwelling address based upon the user's response to the prompt.

14. The non-transitory, tangible computer-readable medium of claim 9, further storing instructions that, when executed by the processor, cause the processor to:
when the database dwelling address is not the correct address, updating the database dwelling address with the reverse the geocoded address.

15. The non-transitory, tangible computer-readable medium of claim 9, further storing instructions that, when executed by the processor, cause the processor to:
transmit the one or more building characteristics to a computing device; and
populate one or more building characteristic fields within a computer-implemented application executed on the computing device with the one or more respective building characteristics.

16. The non-transitory, tangible computer-readable medium of claim 9, wherein the image matching recognition algorithm includes one or more of an edge matching algorithm, a histogram matching algorithm, and a grayscale matching algorithm.

17. An insurance premium quoting system, comprising:
a mobile computing device configured to (i) capture a first image of a dwelling, (ii) determine geographic location data corresponding to a location of the mobile device, and (iii) add the geographic location data as metadata to the first image of the dwelling such that the first image of the dwelling includes geotagged information; and
a computing device configured to:
receive the first image of the dwelling including the geotagged information from the mobile device,
determine a reverse geocoded address by reverse geocoding the geotagged information,
correlate the first image of the dwelling to a second image of the dwelling that is stored in a database via execution of an image matching recognition algorithm to match the first image of the dwelling to the second image of the dwelling, the second image of the dwelling being stored in the database and having a database dwelling address and one or more building characteristics associated therewith,
determine whether the reverse geocoded address associated with the first image of the dwelling matches the database dwelling address associated with the second image of the dwelling,
verify the reverse geocoded address as the correct dwelling address when the reverse geocoded address matches the database dwelling address,
when there is an inconsistency because the reverse geocoded address does not match the database dwelling address, reconcile the inconsistency utilizing a pre-established set of hierarchical prioritization that is based upon data source reliability to establish one of (i) the reverse geocoded address, or (ii) the database dwelling address, as the correct dwelling address,
calculate an insurance premium quote using the correct dwelling address and the one or more building characteristics, and send the insurance premium quote to the mobile computing device,
wherein the mobile computing device is further configured to display the insurance premium quote.

18. The insurance premium quoting system of claim 17, wherein the mobile computing device is further configured to prompt a user to verify that the reverse geocoded address matches the database dwelling address and to establish the correct dwelling address based upon the user's response to the prompt.

19. The insurance premium quoting system of claim 18, wherein the mobile computing device is further configured to, when the database dwelling address is not the correct address,
update the database dwelling address with the reverse geocoded address.

20. The insurance premium quoting system of claim 18, wherein the computing device is further configured to calculate the insurance premium quote using the reverse geocoded address as the correct dwelling address once the user verifies that the reverse geocoded address matches the database dwelling address.

21. The insurance premium quoting system of claim 18, wherein the computing device is further configured to, when the database dwelling address is not the correct address, update the database dwelling address with the correct dwelling address based upon the user's response to the prompt.

22. The insurance premium quoting system of claim 21, wherein the mobile device is further configured to:
populate a corresponding one or more building characteristic fields within a computer-implemented application executed on the mobile computing device with the one or more respective building characteristics.

23. The insurance premium quoting system of claim 21, wherein the first database includes an insurer database or a third-party database.

24. The insurance premium quoting system of claim 17, wherein the computing device is further configured to identify a plurality of other dwellings within a predetermined distance of the correct dwelling address that have insurance premium quotes matching the insurance premium quote within a threshold amount.

25. The insurance premium quoting system 17, wherein the image matching recognition algorithm includes one or more of an edge matching algorithm, a histogram matching algorithm, and a grayscale matching algorithm.

* * * * *